Patented Oct. 27, 1925.

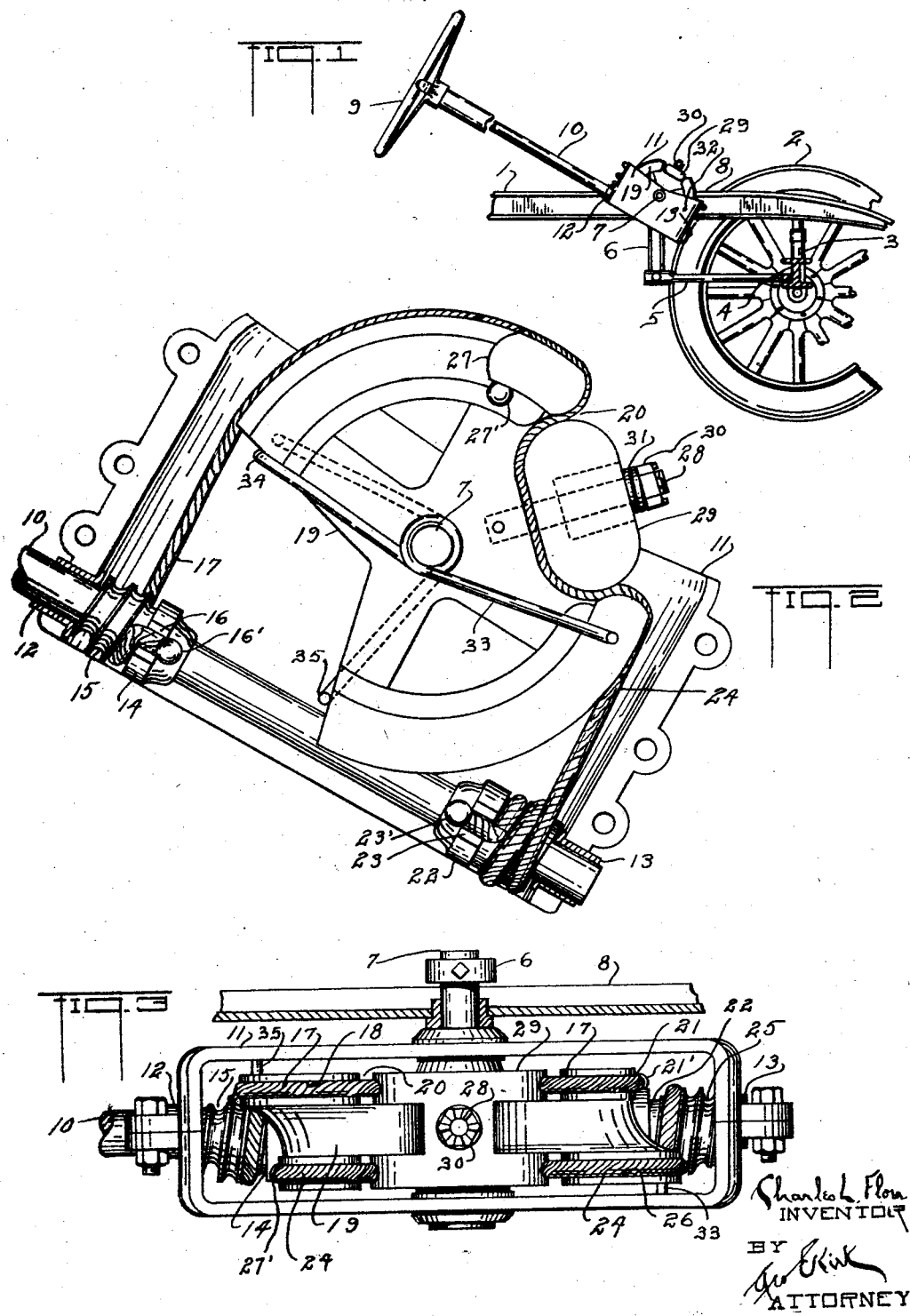

1,558,856

UNITED STATES PATENT OFFICE.

CHARLES L. FLORA, OF SYLVANIA, OHIO.

STEERING DEVICE.

Application filed July 13, 1923. Serial No. 651,219.

*To all whom it may concern:*

Be it known that I, CHARLES L. FLORA, a citizen of the United States of America, residing at Sylvania, Lucas County, Ohio, have invented new and useful Steering Devices, of which the following is a specification.

This invention relates to speed reducing connections.

This invention has utility when incorporated as a transmission connection from a steering column or post to steering links or knuckles in motor vehicles.

Referring to the drawings:—

Fig. 1 is a fragmentary view of a motor vehicle having an embodiment of the invention incorporated therewith;

Fig. 2 is a side elevation, on an enlarged scale, showing an extreme turning position for the connection; and Fig. 3 is an edge view of the device, parts being broken away, the view being with the parts in neutral position and from the compensation block side of the connection.

Motor vehicle 1 is shown as having forward road wheels 2 mounted by steering knuckles 3, connected by link 4. Link 5 from one of the steering knuckles extends rearwardly to depending arm 6 carried by rocker member 7 mounted in the frame 8 of the motor vehicle 1.

Steering wheel 9 is carried adjacent the driver's station in the motor vehicle 1. This wheel 9 is fixed with steering post 10 extending into housing 11 fixedly mounted on the frame 8 at the rocker member or stub shaft 7. This housing 11 has aligned bearings, 12, 13, for the post 10. Adjacent the bearing 12, there is fixed with the post 10 in the housing 11, pulley 14 having variable radius helical groove or guide way 15. This pulley 14 has anchor seat 16 for metal ball end 16' of flexible cable 17, preferably of stranded twisted or braided metal wire. This cable coacts with the groove 15 and has reach therefrom coacting with groove 18 in member 19 as a wheel segment fixed with the stub shaft 7 and on the opposite side of the frame 8 from the arm 6. This cable 17 in extending along the groove 18 spans gap 20 and is held at anchor seat 21 by its metal ball end 21'.

Reversely to the pulley 14 is pulley 22 adjacent the bearing 13. From anchor seat 23 for metal ball end 23' of this pulley 22 extends cable 24 in variable radius grooves 25 and thence by a reach to coact with groove 26 of the segment 19. This cable 24 is similar to the cable 17, but opposite in its direction of extent, so that as the post 10 is rotated, if the cable 17 be wrapped on the pulley 14, then the cable 24 is unwrapped from the pulley 22. This cable 24 extends from the groove 26 in the segment 19 past the gap 20 to anchor 27, similar to the anchor 21. Metal ball end 27' retains this cable 24 in this anchor 27.

The arc shaped grooves 18, 26, at neutral position have the reaches therefrom only slightly divergent in extent from the post 10. In either direction of rotation of the post 10, there is slight slant in the direction of the reaches from the pulleys 14, 22, to the grooves 18, 26. To compensate for this greater distance, the grooves 15, 25, are of less radius in each direction as such distance increases.

For directly adjusting the taut condition of these cables 17, 24, there is mounted in the gap 20 by bolt 28, take-up block 29. This block 29 acts directly upon each cable 17, 24, and is drawn down into holding position by operating nut 30 against spring washer 31 on the fixed bolt 28 carried by the segment 19. The spring washer 31 automatically allows for a little give in this speed reduction transmission connection, as well as insures maintained taut condition. Looseness or backlash is accordingly minimized.

The simplified direct connection makes the steering readily responsive herein. As an auxiliary for easing control of a traveling vehicle equipped with this connection, the housing 7 is provided with a recess or anchor 32 for an end of torsion spring 33 having a wrap about the shaft 7 to extend with its opposite offset terminal 34 against the segment 19. A similar oppositely configured spring 35 is mounted between the housing 11 and the segment 19. At neutral position for straight ahead travel, the two torsion springs 33, 35, are in balance. Upon turning the steering wheel 9 in either direction, the springs 33, 35, act oppositely, tending to resist such turning and further cooperating toward automatically resetting the connection for effecting the neutral or straight ahead travel direction for the vehicle.

What is claimed and it is desired to secure by Letters Patent is:

1. A steering post, a pair of axially spaced grooved pulleys thereon, a member to be rocked, said member being provided with guide ways, flexible means fixed with each pulley and oppositely extending for coacting with the member guide ways and anchored with said member, and a take-up block carried by the member and engaging both flexible means.

2. A steering post, a pair of pulleys thereon, a member to be rocked, a cable from each pulley oppositely extending upon and anchored to said member, and a yieldably mounted take-up block coacting with the pair of cables to keep them taut and minimize lost motion between the post and member.

3. A steering post, pulleys thereon, a rockable member, a pair of cables anchored to the rockable member and oppositely extending to different pulleys, a take-up block coacting with both cables, and a spring coacting with the block for yieldably urging the block to take up simultaneously slack in both cables.

4. A steering post, a rockable member, a pair of cables anchored to the rockable member and oppositely extending therefrom to wrap in different directions about the post and be anchored with the post, and reset means including a spring coacting through said rockable member and cables for urging the post to neutral position.

5. A steering post, helically grooved pulleys on said post, cables anchored with the pulleys and oppositely extending about the post in said grooved pulleys, and a rockable member mounted on an axis at an angle to the axis of the post and rockable by said cables wrapping about one pulley a plurality of pitches in one direction as unwrapping occurs at the other pulley for a plurality of pitches in a similar direction.

6. A steering post, helically grooved pulleys on said post, cables anchored with the pulleys and oppositely extending about the post, and a member to be rocked to which member the cables extend and are anchored therewith, said grooves of the pulleys being of variable radius for automatically compensating with distance change of cable reaches to the member.

In witness whereof I affix my signature.

CHARLES L. FLORA.